US012754707B2

(12) United States Patent
Yang et al.

(10) Patent No.: US 12,754,707 B2
(45) Date of Patent: Oct. 6, 2026

(54) DISPLAY DEVICE

(71) Applicant: Samsung Display Co., Ltd., Yongin-si (KR)

(72) Inventors: Donghyun Yang, Yongin-si (KR); Euisuk Jung, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 366 days.

(21) Appl. No.: 18/537,565

(22) Filed: Dec. 12, 2023

(65) Prior Publication Data

US 2024/0303020 A1 Sep. 12, 2024

(30) Foreign Application Priority Data

Mar. 8, 2023 (KR) ........................ 10-2023-0030806

(51) Int. Cl.
*G06F 3/14* (2006.01)
*G09G 3/3225* (2016.01)

(52) U.S. Cl.
CPC ......... *G06F 3/1446* (2013.01); *G09G 3/3225* (2013.01); *G09G 2300/026* (2013.01)

(58) Field of Classification Search
CPC ................ G06F 3/1446; G09G 3/3225; G09G 2300/026; H10K 59/879; H10K 59/123; H10K 59/872; H10K 59/873
USPC ............................................................ 257/72
See application file for complete search history.

(56) References Cited

U.S. PATENT DOCUMENTS

| | | | | |
|---|---|---|---|---|
| 9,146,400 | B1 * | 9/2015 | Lee | G02B 6/06 |
| 9,818,803 | B2 | 11/2017 | Lee | |
| 11,009,742 | B2 | 5/2021 | Okumura et al. | |
| 2017/0146840 | A1 | 5/2017 | Dai et al. | |
| 2022/0045124 | A1 * | 2/2022 | Lee | H10H 29/142 |
| 2022/0137738 | A1 * | 5/2022 | Kim | G09G 3/006 345/174 |

FOREIGN PATENT DOCUMENTS

| | | | |
|---|---|---|---|
| JP | 6289782 | B1 | 3/2018 |
| KR | 10-2020-0079116 | A | 7/2020 |

* cited by examiner

*Primary Examiner* — Tong-Ho Kim
(74) *Attorney, Agent, or Firm* — Womble Bond Dickinson (US) LLP

(57) ABSTRACT

A display device includes a plurality of display panel tiles, each including a display area including a plurality of pixels and a peripheral area around the display area, each one of the plurality of display panel tiles including a display element in the display area; a thin-film encapsulation layer covering the display element; a first insulating layer arranged on the thin-film encapsulation layer and having an opening partially overlapping a pixel of the plurality of pixels at an outermost part of the display area; a second insulating layer filling the opening of the first insulating layer; and a refractive film on the first insulating layer in the peripheral area.

18 Claims, 8 Drawing Sheets

DISPLAY DEVICE

CROSS-REFERENCE TO RELATED APPLICATION

This application claims priority to and the benefit of Korean Patent Application No. 10-2023-0030806, filed on Mar. 8, 2023, in the Korean Intellectual Property Office, the disclosure of which is incorporated by reference herein in its entirety.

BACKGROUND

1. Field

Aspects of some embodiments relate to display devices.

2. Description of the Related Art

The importance of display devices has increased along with the development of multimedia. In response to this, various types of display devices, such as organic light-emitting displays (OLEDs) and liquid crystal displays (LCDs), have been developed.

SUMMARY

According to some embodiments of the present disclosure, there is provided a display device having improved (e.g., increased) visibility by including a refractive film overlapping a peripheral area. However, aspects of the present disclosure are not limited thereto.

According to some embodiments of the present disclosure, there is provided a display device including: a plurality of display panel tiles, each including a display area including a plurality of pixels and a peripheral area around the display area, each one of the plurality of display panel tiles including: a display element in the display area; a thin-film encapsulation layer covering the display element; a first insulating layer arranged on the thin-film encapsulation layer and having an opening partially overlapping a pixel of the plurality of pixels at an outermost part of the display area; a second insulating layer filling the opening of the first insulating layer; and a refractive film on the first insulating layer in the peripheral area.

In some embodiments, the opening is provided along an edge of the display area.

In some embodiments, a side surface of the first insulating layer defining the opening includes a forward tapered slope.

In some embodiments, the first insulating layer includes an inclined surface in the peripheral area, and the refractive film is on the inclined surface.

In some embodiments, the display device further includes cover windows arranged on the plurality of display panel tiles, wherein an edge of each one of the cover windows has a curved surface.

In some embodiments, the refractive film overlaps an edge of the cover window and is attached to the cover window.

In some embodiments, the plurality of display panel tiles includes a first display panel tile and a second display panel tile adjacent to each other in a first direction, and a first pixel of the first display panel tile and a second pixel of the second display panel tile arranged adjacent to each other in the first direction with the peripheral area therebetween emit light of a same wavelength range.

In some embodiments, a gap between a display area of the first display panel tile and a display area of the second display panel tile in the first direction is narrower than a width of one pixel in the first direction.

In some embodiments, a refractive index of the second insulating layer is greater than a refractive index of the first insulating layer.

In some embodiments, the thin-film encapsulation layer includes a first inorganic encapsulation layer, an organic encapsulation layer, and a second inorganic encapsulation layer sequentially stacked on the display element, and, in the peripheral area, the second inorganic encapsulation layer contacts the first insulating layer.

According to some embodiments of the present disclosure, there is provided a display device including: a plurality of display panel tiles, each including a display area including a plurality of pixels and a peripheral area around the display area, each of the plurality of display panel tiles including: a display element in the display area; a thin-film encapsulation layer on the display element; a first insulating layer arranged on the thin-film encapsulation layer, having an opening provided in the display area along an edge of the display area, and having an inclined surface in the peripheral area; a second insulating layer filling the opening of the first insulating layer; and a refractive film on the inclined surface of the first insulating layer in the peripheral area.

In some embodiments, the plurality of display panel tiles include a first display panel tile and a second display panel tile adjacent to each other in a first direction, and a first pixel of the first display panel tile and a second pixel of the second display panel tile arranged adjacent to each other in the first direction with the peripheral area therebetween emit light of a same wavelength range.

In some embodiments, a gap between the display area of the first display panel tile and the display area of the second display panel tile in the first direction is narrower than a width of one pixel in the first direction.

In some embodiments, the opening is provided to overlap the first pixel and the second pixel.

In some embodiments, the refractive film is between the first pixel and the second pixel.

In some embodiments, the display device further includes a cover window on the second insulating layer, wherein the refractive film is on an edge of the cover window.

In some embodiments, the edge of the cover window has a curved surface.

In some embodiments, a refractive index of the second insulating layer is greater than a refractive index of the first insulating layer.

In some embodiments, a side surface of the first insulating layer defining the opening includes a forward tapered slope.

In some embodiments, the thin-film encapsulation layer includes a first inorganic encapsulation layer, an organic encapsulation layer, and a second inorganic encapsulation layer sequentially stacked on the display element, and, in the peripheral area, the second inorganic encapsulation layer contacts the first insulating layer.

Additional aspects will be set forth in part in the description which follows and, in part, will be apparent from the description, or may be learned by practice of the presented embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
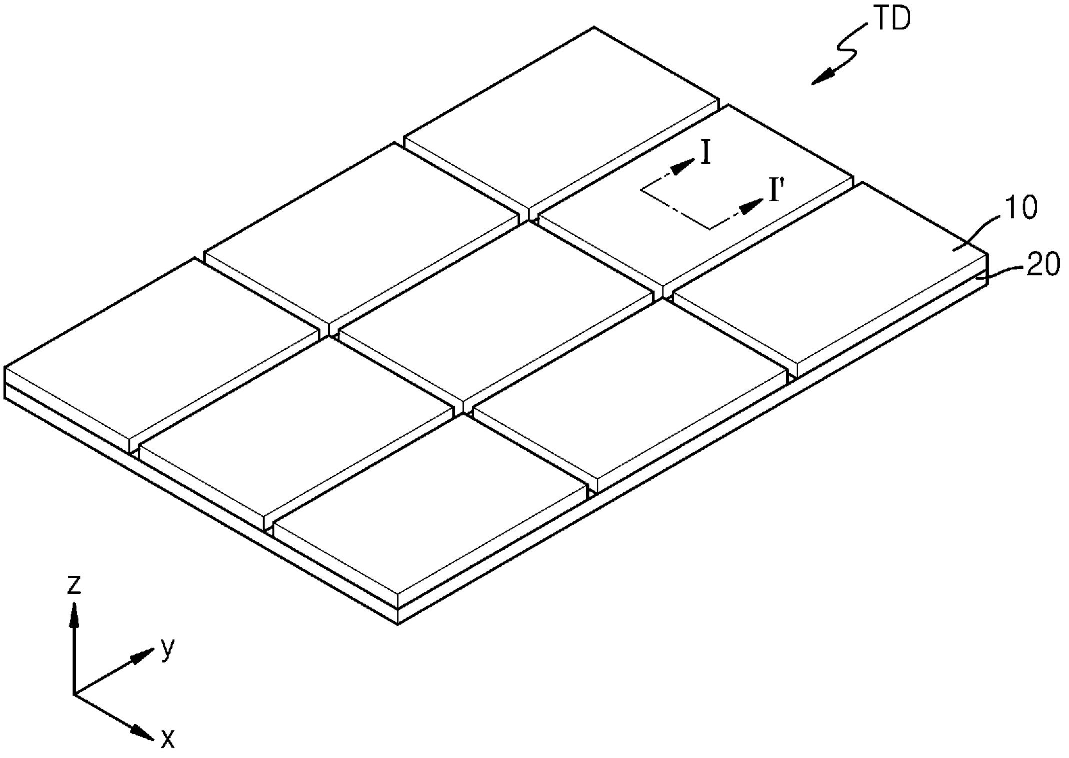
FIG. 1 is a schematic perspective view of a display device according to some embodiments of the present disclosure.

Various modifications may be applied to the present embodiments, and particular embodiments will be illustrated in the drawings and described in the detailed description section. The effect and features of the present embodiments, and a method to achieve the same, will be clearer referring to the detailed descriptions below with the drawings. However, the present embodiments may be implemented in various forms, and are not limited to the embodiments presented below.

Hereinafter, exemplary embodiments will be described in detail with reference to the accompanying drawings, and in the description with reference to the drawings, the same or corresponding constituents are indicated by the same reference numerals and redundant descriptions thereof are omitted.

When a certain embodiment may be implemented differently, a specific process order may be performed differently from the described order. For example, two consecutively described processes may be performed substantially at the same time or performed in an order opposite to the described order.

Figure 2:
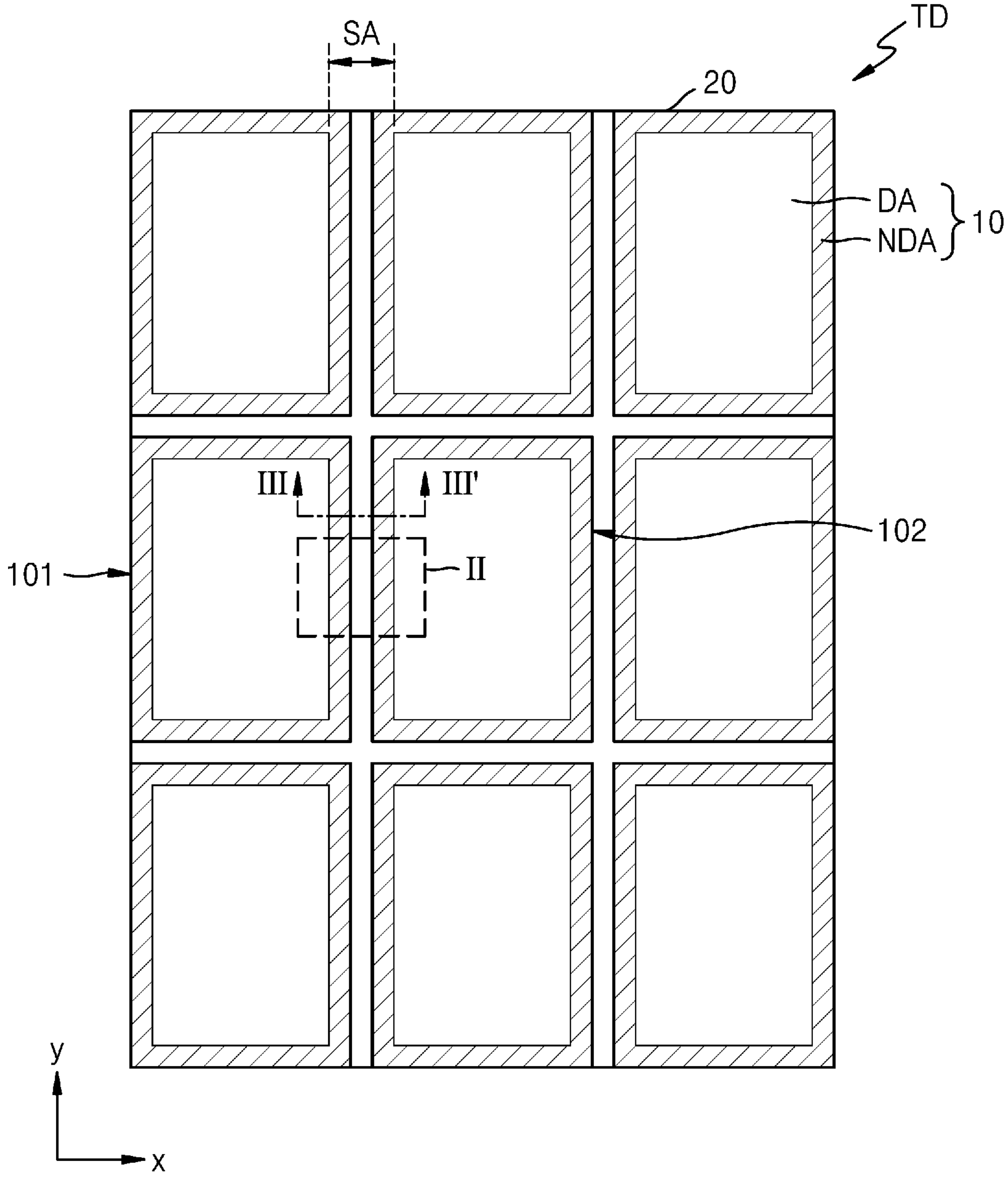
FIG. 2 is a schematic plan view of a display device according to some embodiments of the present disclosure.

FIG. 1 is a schematic perspective view of a display device according to some embodiments of the present disclosure; FIG. 2 is a schematic plan view of the display device according to some embodiments of the present disclosure; and FIG. 3 is a schematic cross-sectional view of the display device according to some embodiments of the present disclosure.

Figure 3:
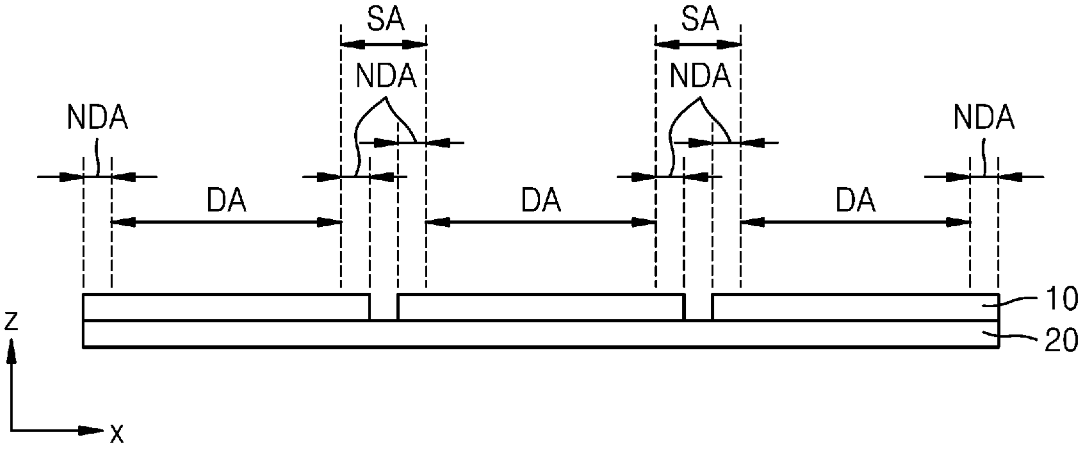
FIG. 3 is a schematic cross-sectional view of a display device according to some embodiments of the present disclosure.

Referring to FIGS. 1 to 3, a display device TD displays moving images or still images. The display device TD may refer to any electronic device providing a display screen. For example, a television, a laptop, a monitor, a billboard, Internet of Things, a mobile phone, a smart phone, a tablet personal computer (PC), an electronic watch, a smart watch, a watch phone, a head-mounted display, a mobile communication terminal, an electronic notebook, an electronic book, a portable multimedia player (PMP), a navigation device, a game machine, a digital camera, a camcorder, or the like may be included in the display device TD. The display device TD may include a plurality of display panel tiles 10. The display device TD may further include a lower plate 20.

Hereinafter, in the drawings describing the display device TD, a first direction (e.g., the x direction), a second direction (e.g., the y direction), and a third direction (e.g., the z direction) may be defined. The first direction (e.g., the x direction) and the second direction (e.g., the y direction) may be directions perpendicular to each other within one plane. The third direction (e.g., the z direction) may be a direction perpendicular to a plane in which the first direction (e.g., the x direction) and the second direction (e.g., the y direction) are located. The third direction (e.g., the z direction) may indicate a thickness direction (or a display direction) of the display device TD.

The display device TD may have a rectangular shape including a short side in the first direction (e.g., the x direction) and a long side in the second direction (e.g., the y direction) in a plan view. The display device TD may have a planar shape as a whole; however, embodiments of the present disclosure are not limited thereto. By having a three-dimensional shape, the display device TD may provide a user with a three-dimensional effect. For example, when the display device TD has a three-dimensional shape, at least some of the plurality of display panel tiles 10 described below may have a curved shape. In other examples, as the plurality of display panel tiles 10 have planar shapes and are arranged to have a certain angle with each other, the display device TD may have a three-dimensional shape. As the display device TD includes the plurality of display panel tiles 10, the display area on which images are displayed may be enlarged.

The lower plate 20 may provide and support an area where the plurality of display panel tiles 10 are disposed. The planar shape of the lower plate 20 may follow the planar shape of the display device TD. In embodiments in which the display device TD has a rectangular shape including a short side in the first direction (e.g., the x direction) and a long side in the second direction (e.g., the y direction) in a plan view, the lower plate 20 may have a rectangular shape including a short side in the first direction (e.g., the x direction) and a long side in the second direction (e.g., the y direction) in a plan view. Various wires and cables electrically connecting the plurality of display panel tiles 10 may be disposed on the lower plate 20, and a fastening member capable of fixing the plurality of display panel tiles 10 may be further disposed on the lower plate 20.

The plurality of display panel tiles 10 may be disposed on the lower plate 20. The plurality of display panel tiles 10 may be fixed on one surface of the lower plate 20 through the fastening member; however, embodiments of the present disclosure are not limited thereto.

The plurality of display panel tiles 10 may be arranged in a matrix shape on the lower plate 20. The plurality of display panel tiles 10 may be apart from each other in the first direction (e.g., the x direction) and the second direction (e.g., the y direction) in a plan view and may be arranged at certain intervals. The display panel tiles 10 disposed adjacent to each other may be apart from each other such that long sides and/or short sides face each other. As the plurality of display panel tiles 10 are apart from each other on the lower plate 20 at certain intervals, even when the display panel tiles 10 expand due to heat generated from the display panel tiles 10, a display panel tile 10 may be prevented from being damaged, or damage thereto may be substantially reduced, by an adjacent display panel tile 10. In the drawings, a case in which the plurality of display panel tiles 10 are arranged in a 3×3 matrix shape is illustrated. However, the number and arrangement of display panel tiles 10 are not limited thereto.

In the drawings, a case in which an arrangement direction of the plurality of display panel tiles 10 coincides with the first direction (e.g., the x direction) and the second direction (e.g., the y direction), which are extension directions of the long and short sides of the display device TD, is illustrated. However, embodiments of the present disclosure are not limited thereto. For example, the arrangement direction of the plurality of display panel tiles 10 and the extension directions of the long and short sides of the display device TD may be inclined with a certain inclination.

Each of the plurality of display panel tiles 10 may have a rectangular shape including a short side in the first direction (e.g., the x direction) and a long side in the second direction (e.g., the y direction) in a plan view. However, embodiments of the present disclosure are not limited thereto, and each of the plurality of display panel tiles 10 may have a rectangular shape including a long side in the first direction (e.g., the x direction) and a short side in the second direction (e.g., the y direction). The plurality of display panel tiles 10 may have the same planar shape as each other. Also, the plurality of display panel tiles 10 may have the same size as each other. However, the plurality of display panel tiles 10 are not limited thereto and may have different planar shapes or different sizes.

Each of the plurality of display panel tiles 10 includes a display panel providing a display screen. Examples of the display panel include an inorganic light-emitting diode display panel, an organic light-emitting display panel, a quantum dot light-emitting display panel, a plasma display panel, and a field emission display panel. Hereinafter, as an example of the display panel, a case in which an inorganic light-emitting diode display panel is applied is illustrated. However, embodiments of the present disclosure are not limited thereto, and the same technical idea may be applied to other display panels if applicable.

Each of the plurality of display panel tiles 10 may include a display area DA and a peripheral area NDA. The display area DA may be an area on which an image may be displayed, and the peripheral area NDA may be a non-display area on which an image is not displayed (e.g., cannot be displayed).

The shape of the display area DA may follow the shape of the display panel tile 10. For example, the shape of the display area DA may be a rectangular shape in a plan view similar to the overall shape of the display panel tile 10. The display area DA may generally occupy the center of the display panel tile 10.

The display area DA may include a plurality of pixels PX. Each of the plurality of pixels PX means sub-pixels emitting different colors. The plurality of pixels PX may be arranged in a matrix structure. The shape of each pixel PX may be a rectangle or a square in a plan view. In some embodiments, each pixel PX includes a plurality of light-emitting devices made of inorganic particles; however, embodiments of the present disclosure are not limited thereto.

The peripheral area NDA may be disposed around the display area DA. The peripheral area NDA may entirely or partially surround the display area DA.

The display device TD may further include a boundary area SA between adjacent display panel tiles 10. As described above, the plurality of display panel tiles 10 may be apart from each other (e.g., offset from each other) and arranged at certain intervals, and the boundary area SA may include a separation area between display panel tiles 10 disposed adjacent to each other.

The boundary area SA refers to an area between the display areas DA of the display panel tiles 10 disposed adjacent to each other. The boundary area SA may include peripheral areas NDA of the display panel tiles 10 disposed adjacent to each other and a separation area between the peripheral areas NDA. The boundary area SA may surround the display area DA of the adjacent display panel tile 10. The boundary area SA may also be referred to as a seam.

An image may not be displayed in the boundary area SA of the display device TD. Therefore, when the width of the boundary area SA where an image is not displayed is large, a user recognizes the boundary area SA and immersion in the image of the display device TD may be reduced. Therefore, in order for the plurality of display panel tiles 10 to display an image as one display device, the separation distance between adjacent display panel tiles 10 may be small enough that a user does not perceive the boundary area SA where the image is not displayed. That is, the display device TD may prevent the separation area between the plurality of display panel tiles 10 and the peripheral area NDA of the display panel tile 10 from being recognized (or substantially reduce recognition of the peripheral area NDA), thereby removing a sense of disconnection between the plurality of display panel tiles 10 and improving immersion in the image.

Figure 4:
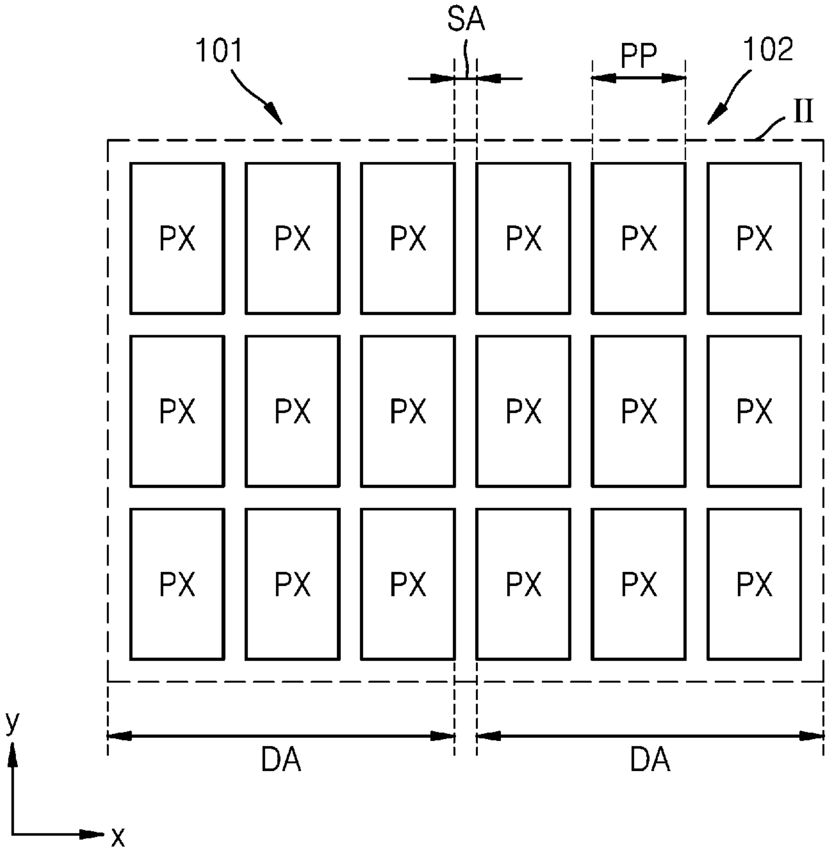
FIG. 4 is a plan view schematically illustrating an enlarged region II of FIG. 2, according to some embodiments of the present disclosure.

FIG. 4 is a plan view schematically illustrating an enlarged region II of FIG. 2, according to some embodiments of the present disclosure. Referring to FIGS. 2 and 4, the plurality of display panel tiles 10 may include a first display panel tile 101 and a second display panel tile 102. The first display panel tile 101 and the second display panel tile 102 may be adjacent to each other in a first direction (e.g., the x direction). Each of the first display panel tile 101 and the second display panel tile 102 may include a plurality of pixels PX. Each of the plurality of pixels PX may emit, for example, red, green, or blue light or red, green, blue, or white light.

A boundary area SA between the first display panel tile 101 and the second display panel tile 102 may be an area between a display area DA of the first display panel tile 101 and a display area DA of the second display panel tile 102. A gap, in the first direction (e.g., the x direction), of the boundary area SA between the first display panel tile 101 and the second display panel tile 102 may be less than a width PP of one pixel in the first direction (e.g., the x direction). Accordingly, a sense of disconnection between the plurality of display panel tiles 10 may be reduced.

Figure 5:
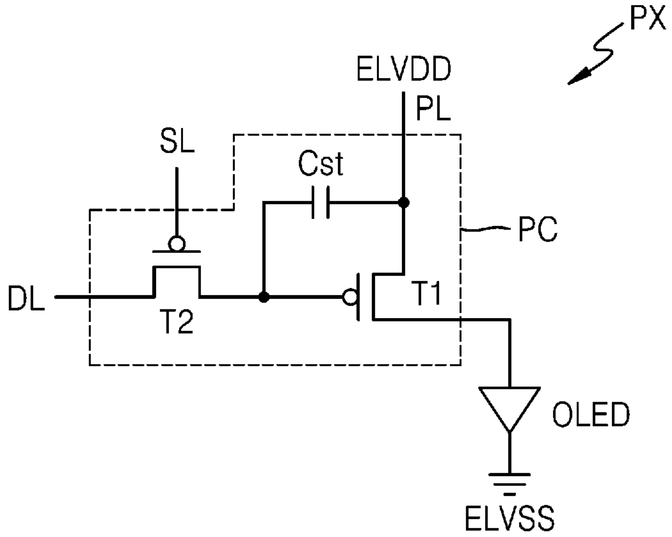
FIG. 5 is an equivalent circuit diagram of one pixel included in the display device of FIG. 1, according to some embodiments of the present disclosure.

FIG. 5 illustrates a display element provided in any one pixel of a display device according to some embodiments and a pixel circuit connected to the display element.

Referring to FIG. 5, an organic light-emitting diode OLED as a display element is connected to a pixel circuit PC. The pixel circuit PC may include a first thin-film transistor T1, a second thin-film transistor T2, and a storage capacitor Cst. The organic light-emitting diode OLED may emit, for example, red, green, or blue light, or may emit red, green, blue, or white light.

The second thin-film transistor T2 may be a switching thin-film transistor and may be connected to a scan line SL and a data line DL. The second thin-film transistor T2 and may be configured to transmit, to the first thin-film transistor T1, a data voltage provided from the data line DL, based on a switching voltage provided from the scan line SL. The storage capacitor Cst may be connected to the second thin-film transistor T2 and a driving voltage line PL and may be configured to store a voltage corresponding to a difference between a voltage received from the second thin-film transistor T2 and a first power voltage ELVDD supplied to the driving voltage line PL.

The first thin-film transistor T1 may be a driving thin-film transistor and may be connected to the driving voltage line PL and the storage capacitor Cst. The first thin-film transistor T1 and may be configured to control a driving current flowing from the driving voltage line PL through the organic light-emitting diode OLED, according to a value of the voltage stored in the storage capacitor Cst. The organic light-emitting diode OLED may emit light having a certain brightness according to the driving current. An opposite electrode (for example, a cathode) of the organic light-emitting diode OLED may receive a second power voltage ELVSS.

FIG. 5 illustrates that the pixel circuit PC includes two thin-film transistors and one storage capacitor. However, in other embodiments, the number of thin-film transistors and the number of storage capacitors may be variously modified according to the design of the pixel circuit PC.

Figure 6:
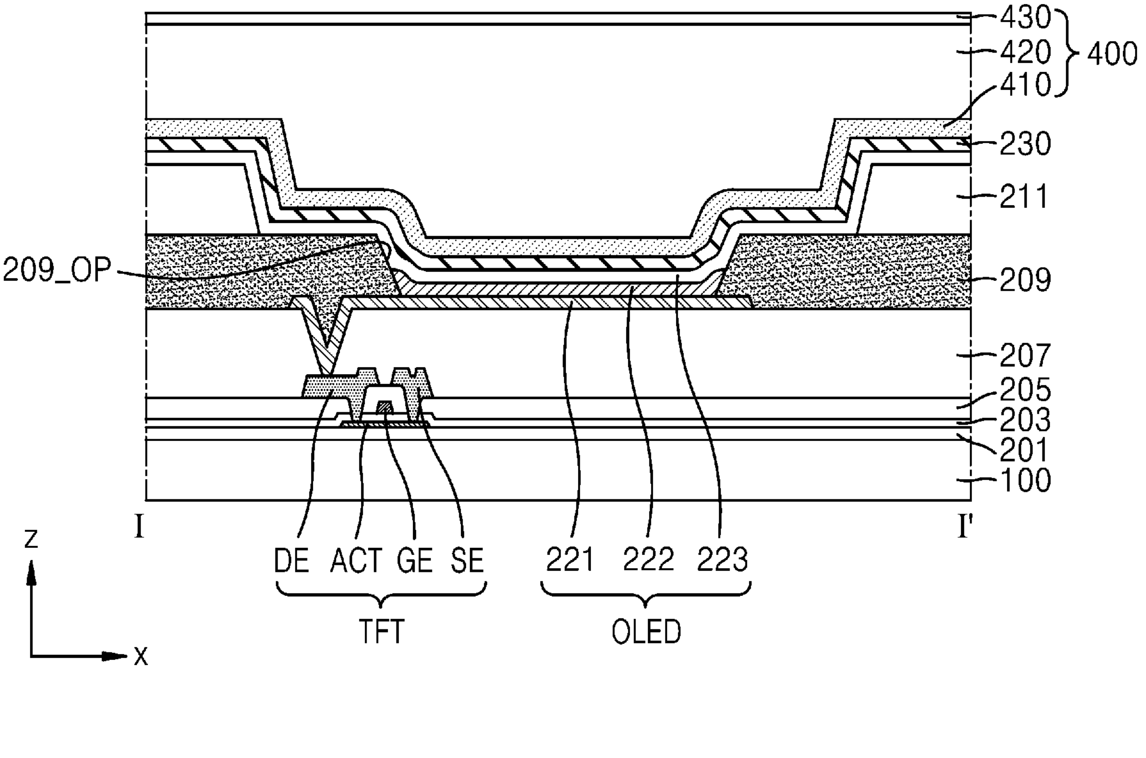
FIG. 6 is a cross-sectional view schematically illustrating a cross-section of the display device taken along a line I-I' of FIG. 1, according to some embodiments of the present disclosure.

FIG. 6 is a cross-sectional view schematically illustrating a cross-section of the display device TD taken along the line I-I' of FIG. 1, and is a cross-sectional view schematically illustrating the display area DA of the display panel tile 10.

Referring to FIG. 6, a display device according to some embodiments includes an organic light-emitting diode OLED as a display element having an emission area on a substrate 100, and a thin-film encapsulation layer 400 covering the display element.

The substrate 100 may include a single layer of glass material. In some examples, the substrate 100 may include a polymer resin. The substrate 100 including the polymer resin may have a structure in which a layer including the polymer resin and an inorganic layer are stacked. In some embodiments, the substrate 100 includes polymer resin, such as polyethersulfone, polyarylate, polyether imide, polyethylene naphthalate, polyethylene terephthalate, polyphenylene sulfide, polyimide, polycarbonate, cellulose triacetate, cellulose acetate propionate, and/or the like, and may be flexible. The substrate 100 may include glass containing $SiO_2$ as a main component or a resin, such as reinforced plastic, and may have a rigid property.

A thin-film transistor TFT may include a semiconductor layer ACT including amorphous silicon, polycrystalline silicon, or an organic semiconductor material, and may further include a gate electrode GE, a source electrode SE, and a drain electrode DE. In order to secure insulation between the semiconductor layer ACT and the gate electrode GE, a gate insulating layer 203 including an inorganic material (such as silicon oxide, silicon nitride, and/or silicon oxynitride) may be disposed between the semiconductor layer ACT and the gate electrode GE. In addition, an interlayer insulating layer 205 including an inorganic material, such as silicon oxide, silicon nitride, and/or silicon oxynitride, may be disposed above the gate electrode GE, and the source electrode SE and the drain electrode DE may be disposed on the interlayer insulating layer 205 described above. Insulating layers including an inorganic material may be formed through chemical vapor deposition (CVD) or atomic layer deposition (ALD).

The gate electrode GE, the source electrode SE, and the drain electrode DE may include various suitable conductive materials. The gate electrode GE may include at least one of molybdenum, aluminum, copper, and titanium, and may have a multi-layered structure in some examples. For example, the gate electrode GE may include a single layer including molybdenum or have a three-layered structure including a first molybdenum layer, an aluminum layer, and a second molybdenum layer. The source electrode SE and the drain electrode DE may each include at least one of copper, titanium, and aluminum, and may each have a multi-layered structure in some examples. For example, the source electrode SE and the drain electrode DE may each have a three-layered structure including a first titanium layer, an aluminum layer, and a second titanium layer.

A buffer layer 201 including an inorganic material, such as silicon oxide, silicon nitride, and/or silicon oxynitride, may be disposed between the thin-film transistor TFT and the substrate 100. The buffer layer 201 may increase the smoothness of the upper surface of the substrate 100 or prevent or substantially reduce the penetration of impurities from the substrate 100 into the semiconductor layer ACT of the thin-film transistor TFT.

A planarization insulating layer 207 may be disposed on the thin-film transistor TFT. The planarization insulating layer 207 may include, for example, an organic material, such as acrylic, benzocyclobutene (BCB), or hexamethyldisiloxane (HMDSO). Although the planarization insulating layer 207 is shown as a single layer in FIG. 5, the planarization insulating layer 207 may be multi-layered.

A pixel electrode 221 may be disposed on the planarization insulating layer 207. The pixel electrode 221 may be separately formed for each pixel. Pixel electrodes 221 respectively corresponding to adjacent pixels may be spaced apart from each other.

The pixel electrode 221 may be a reflective electrode. In some embodiments, the pixel electrode 221 includes a reflective film including Ag, Mg, Al, Pt, Pd, Au, Ni, Nd, Ir, Cr, or a compound thereof, and a transparent or translucent electrode layer formed on the reflective film. The transparent or translucent electrode layer may include at least one selected from the group including indium tin oxide (ITO), indium zinc oxide (IZO), zinc oxide (ZnO), indium oxide ($In_2O_3$), indium gallium oxide (IGO), and aluminum zinc oxide (AZO). In some embodiments, the pixel electrode 221 has a three-layered structure including a first ITO layer, an Ag layer, and a second ITO layer.

A pixel-defining layer 209 is disposed on the pixel electrode 221. The pixel-defining layer 209 has an opening 209_OP exposing a central portion of each pixel electrode 221. The pixel-defining layer 209 covers the edge of the pixel electrode 221 and increases the distance between the edge of the pixel electrode 221 and an opposite electrode 223 to prevent or substantially reduce instances of an arc (e.g., an electrical arc) or the like from occurring at the edge of the pixel electrode 221. The pixel-defining layer 209 may include an organic insulating material, such as polyimide, polyamide, acrylic resin, benzocyclobutene, HMDSO, or phenol resin and may be formed by spin coating or the like. In some examples, the pixel-defining layer 209 may include an inorganic insulating material. In some examples, the pixel-defining layer 209 may have a multi-layered structure including an inorganic insulating material and an organic insulating material.

In some embodiments, the pixel-defining layer 209 includes a light-blocking material and may be provided in black. The light-blocking material may include resin or paste including carbon black, carbon nanotube, or black dye, metal particles, such as nickel, aluminum, molybdenum, and an alloy thereof, metal oxide particles (e.g., chromium oxide), metal nitride particles (e.g., chromium nitride), and/or the like. When the pixel-defining layer 209 includes a light-blocking material, reflection of external light by metal structures disposed under the pixel-defining layer 209 may be reduced.

A spacer 211 may be disposed on the pixel-defining layer 209. The spacer 211 may prevent layers disposed between the substrate 100 and the spacer 211 from being damaged, or may substantially reduce damage thereto, by a mask used in a process of forming an emission layer 222 to be described below. The spacer 211 may include the same material as the pixel-defining layer 209. In some embodiments, the spacer 211 includes a light-blocking material.

The emission layer 222 may be disposed inside the opening 209_OP of the pixel-defining layer 209. The emission layer 222 may include an organic material including a fluorescent or phosphorescent material capable of emitting red, green, or red light. The organic material described above may be a low molecular weight organic material or a high molecular weight organic material. The emission layer 222 may include a plurality of emission layers 222 overlapping each other. The display device according to some embodiments adopts a tandem structure, that is, a structure in which a plurality of emission layers 222 are stacked, thereby increasing light efficiency and extending the lifespan of the display device.

The opposite electrode 223 may be disposed on the emission layer 222. The opposite electrode 223 may be a cathode, which is an electron injection electrode. In this case, as a material for the opposite electrode 223, a metal having a low work function, an alloy, an electrically conductive compound, or any combination thereof may be used. The opposite electrode 223 may be a transmissive electrode, a transflective electrode, or a reflective electrode.

The opposite electrode 223 may include lithium (Li), silver (Ag), magnesium (Mg), aluminum (Al), aluminum-lithium (Al—Li), calcium (Ca), magnesium-indium (Mg—In), magnesium-silver (Mg—Ag), ytterbium (Yb), silver-ytterbium (Ag—Yb), ITO, IZO, or any combination thereof. The opposite electrode 223 may have a single-layered structure including a single layer or a multi-layered structure including a plurality of layers. In some embodiments, light efficiency is increased by disposing a capping layer on the opposite electrode 223.

A thin-film encapsulation layer 400 may be disposed on the opposite electrode 223. The thin-film encapsulation layer 400 may include at least one inorganic encapsulation layer and at least one organic encapsulation layer. For example, the thin-film encapsulation layer 400 may include a first inorganic encapsulation layer 410, an organic encapsulation layer 420, and a second inorganic encapsulation layer 430, as shown in FIG. 6.

The first inorganic encapsulation layer 410 and the second inorganic encapsulation layer 430 may include one or more inorganic insulating materials selected from aluminum oxide, titanium oxide, tantalum oxide, hafnium oxide, zinc oxide, silicon oxide, silicon nitride, and silicon oxynitride. The first inorganic encapsulation layer 410 and the second inorganic encapsulation layer 430 may each have a single-layered or multi-layered structure including the aforementioned inorganic insulating materials. The first inorganic encapsulation layer 410 may not include lithium fluoride (LiF).

The organic encapsulation layer 420 may relieve internal stress of the first inorganic encapsulation layer 410 and/or the second inorganic encapsulation layer 430. The organic encapsulation layer 420 may include a polymer-based material. Examples of the polymer-based material include polyethylene terephthalate, polyethylene naphthalate, polycarbonate, polyimide, polyethylene sulfonate, polyoxymethylene, polyarylate, hexamethyldisiloxane, acrylic resins (e.g., polymethyl methacrylate, polyacrylic acid, etc.), or any combination thereof.

The organic encapsulation layer 420 may be formed by applying a monomer having flowability and then curing the monomer layer by using heat or light such as ultraviolet rays. In some examples, the organic encapsulation layer 420 may be formed by applying the aforementioned polymer-based material.

Even when a crack occurs in the thin-film encapsulation layer 400 through the multi-layered structure described above, the thin-film encapsulation layer 400 may prevent the crack from being connected between the first inorganic encapsulation layer 410 and the organic encapsulation layer 420 or between the organic encapsulation layer 420 and the second inorganic encapsulation layer 430. Accordingly, the formation of a path through which moisture or oxygen from the outside penetrates into the display area DA may be prevented or substantially reduced.

Figure 7:
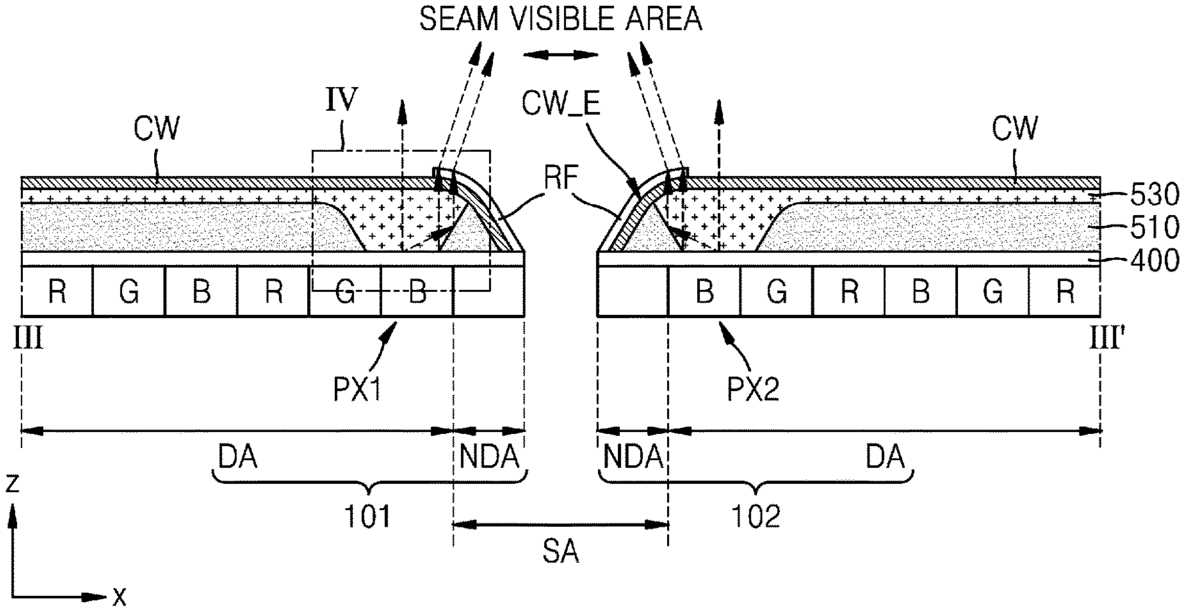
FIG. 7 is a cross-sectional view schematically illustrating a cross section of the display device taken along a line III-III' of FIG. 2, according to some embodiments of the present disclosure.
Figure 8:
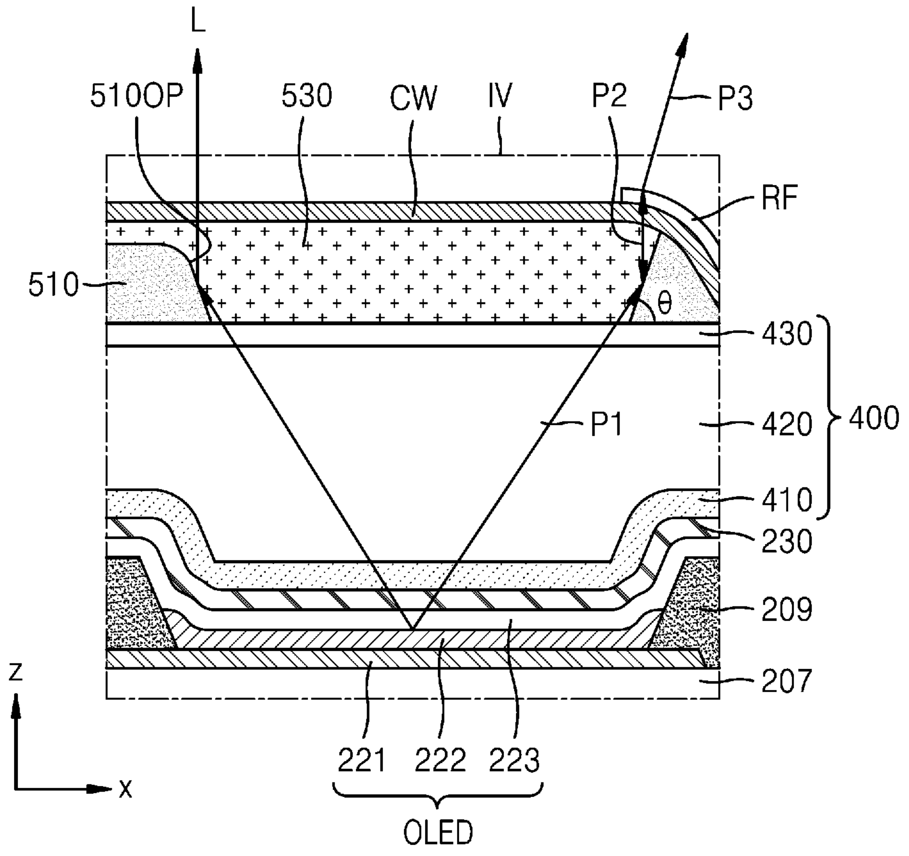
FIG. 8 is a cross-sectional view schematically illustrating an enlarged area IV of FIG. 7, according to some embodiments of the present disclosure.

FIG. 7 is a cross-sectional view schematically illustrating a cross section of the display device TD taken along the line III-III' of FIG. 2, and FIG. 8 is a cross-sectional view schematically illustrating an enlarged area IV of FIG. 7.

FIG. 7 schematically shows parts of the first display panel tile 101 and the second display panel tile 102 of FIG. 2. Referring to FIG. 7, each of the first display panel tile 101 and the second display panel tile 102 may include a thin-film encapsulation layer 400, a first insulating layer 510, a second insulating layer 530, a cover window CW, and a refractive film RF.

Referring to FIGS. 7 and 8, the first insulating layer 510 may be disposed on the thin-film encapsulation layer 400. The first insulating layer 510 may contact the second inorganic encapsulation layer 430. The first insulating layer 510 may include an opening 510OP overlapping the display area DA. The opening 510OP may be provided along the edge of the display area DA of each of the plurality of display panel tiles 10 (see FIG. 2). The opening 510OP of the first insulating layer 510 may overlap pixels disposed at the outermost part of the display area DA of each of the plurality of display panel tiles 10. For example, as shown in FIG. 7, the opening 510OP of the first insulating layer 510 may partially overlap a first pixel PX1 disposed on the outermost part of the display area DA of the first display panel tile 101. The opening 510OP of the first insulating layer 510 may partially overlap a second pixel PX2 disposed on the outermost part of the display area DA of the second display panel tile 102.

The first pixel PX1 and the second pixel PX2 are disposed adjacent to each other in a first direction (e.g., the x direction). The first pixel PX1 and the second pixel PX2 may emit light of the same wavelength range. In FIG. 7, the first pixel PX1 and the second pixel PX2, which are the outermost pixels, are illustrated as emitting blue light. However, embodiments of the present disclosure are not limited thereto. For example, the first pixel PX1 and the second pixel PX2 may emit red or green light, or any other suitable color light.

A side surface of the first insulating layer 510 defining the opening 510OP of the first insulating layer 510 may have a forward tapered slope. Referring to FIG. 8, an angle θ of the side surface of the first insulating layer 510 defining the opening 510OP may be about 5° to about 90°. The angle θ may be an acute angle between a side surface of the first insulating layer 510 and a top surface of the second inorganic encapsulation layer 430.

Referring to FIG. 7, the first insulating layer 510 may include an inclined surface in the peripheral area NDA. The refractive film RF may be disposed on the inclined surface formed in the peripheral area NDA.

The first insulating layer 510 may include an organic insulating material. Examples of the organic insulating material of the first insulating layer 510 may include acrylic resin, epoxy resin, polyimide, and polyethylene. In some embodiments, the second insulating layer 530 includes (ethylh)exyl acrylate, pentafluoropropyl acrylate, poly(ethylene glycol) dimethacrylate, ethylene glycol dimethacrylate, and/or the like. In some embodiments, the first insulating layer 510 further includes a photocurable material. In some embodiments, the first insulating layer 510 includes a material forming the organic encapsulation layer 420 of the thin-film encapsulation layer 400.

The refractive index of the first insulating layer 510 may be about 1.3 to about 1.6. In some embodiments, the refractive index of the first insulating layer 510 is about 1.4 to about 1.55.

The second insulating layer 530 may be disposed on the first insulating layer 510. An upper surface of the second insulating layer 530 may be formed to be substantially flat. The second insulating layer 530 may at least partially fill the opening 510OP of the first insulating layer 510.

The material of the second insulating layer 530 may be different from that of the first insulating layer 510. The second insulating layer 530 may include an organic insulating material, such as acrylic resin, epoxy resin, polyimide, and polyethylene. As an example, the second insulating layer 530 may include polydiarylsiloxane, methyltrimethoxysilane, tetramethoxysilane, and/or the like. In some embodiments, the second insulating layer 530 includes an acryl-based and/or siloxane-based organic material. In the second insulating layer 530, dispersed particles for high refractive index, for example, metal oxide particles such as zinc oxide (ZnOx), titanium oxide ($TiO_2$), and zirconium oxide ($ZrO_2$), may be dispersed in the organic insulating material described above.

The second insulating layer 530 may be a planarization layer having the refractive index of the second insulating layer 530. The refractive index of the second insulating layer 530 may be greater than that of the first insulating layer 510. The refractive index of the second insulating layer 530 may be about 1.6 to about 1.85.

The cover window CW may be disposed on the second insulating layer 530. The cover window CW may be disposed on each of the plurality of display panel tiles 10. The cover window CW may cover the display panel tile 10. The cover window CW may be adhered to the display panel tile 10 by an adhesive member. The adhesive member may be, for example, pressure sensitive adhesive (PSA). The cover window CW may be folded or bent according to an external force without cracks or the like.

The cover window CW may have high transmittance to transmit light emitted from the display panel tile 10 and may be thin to reduce the weight of the display device. In addition, the cover window CW may have sufficient strength and hardness to protect the display panel tile 10 from external impact. The cover window CW may include, for example, glass or plastic. In some embodiments, the cover window CW is ultra-thin tempered glass whose strength is enhanced by a method, such as chemical strengthening or thermal strengthening.

An edge CW_E of the cover window CW may have a curved surface. The edge CW_E of the cover window CW is an edge area of the cover window CW and may be an area overlapping the peripheral area NDA of each of the plurality of display panel tiles 10. The edge CW_E of the cover window CW may overlap an inclined surface of the first insulating layer 510 formed in the peripheral area NDA.

The refractive film RF may overlap the edge CW_E of the cover window CW and may be attached on the cover window CW. The refractive film RF may overlap the inclined surface of the first insulating layer 510 formed in the peripheral area NDA. That is, the edge CW_E of the cover window CW may be disposed on the inclined surface of the first insulating layer 510, and the refractive film RF may be disposed on the edge CW_E of the cover window CW. A portion of the refractive film RF may overlap the display area DA.

Due to the difference in structure and/or refractive index between the first insulating layer 510 and the second insulating layer 530, as shown in FIG. 8, light L emitted from the emission layer 222 may travel along a first path P1 in a direction oblique to a third direction (e.g., the z direction), be refracted at the side defining the opening 510OP of the first insulating layer 510, and travel along a second path P2, that is, in a direction (e.g., the z direction) perpendicular to the upper surface of the substrate 100. Accordingly, the light emission efficiency (e.g., the frontal efficiency) of the display device may be improved (e.g., increased).

In addition, the light L traveling along the second path P2 may be refracted by the refractive film RF and travel along a third path P3. The third path P3 may be a path curved in a direction toward the boundary area SA of the display panel tiles 10 in the third direction (e.g., the z direction). Accordingly, the light emitted from the emission layer 222 of the first and second pixels PX1 and PX2 may reach the boundary area SA and reduce a sense of disconnection between the plurality of display panel tiles 10. The display screen of the display device may be extended to the boundary area SA, and thus, a user does not recognize the boundary area SA and the immersion of images may be improved.

It will be understood that, although the terms “first”, “second”, “third”, etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as “beneath”, “below”, “lower”, “under”, “above”, “upper” and the like, may be used herein for ease of description to describe one element or feature’s relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as “below” or “beneath” or “under” other elements or features would then be oriented “above” the other elements or features. Thus, the example terms “below” and “under” can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include," "including," "comprises," "comprising," "has," "have," and "having," when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. For example, the expression "A and/or B" denotes A, B, or A and B. Expressions such as "one or more of" and "at least one of," when preceding a list of elements, modify the entire list of elements and do not modify the individual elements of the list. For example, the expression "one or more of A, B, and C," "at least one of A, B, or C," "at least one of A, B, and C," and "at least one selected from the group consisting of A, B, and C" indicates only A, only B, only C, both A and B, both A and C, both B and C, or all of A, B, and C.

Further, the use of "may" when describing embodiments of the inventive concept refers to "one or more embodiments of the inventive concept." Also, the term "exemplary" is intended to refer to an example or illustration.

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on," "directly connected to", "directly coupled to", "in contact with", "in direct contact with", or "immediately adjacent" another element or layer, there are no intervening elements or layers present.

As used herein, the term "substantially," "about," and similar terms are used as terms of approximation and not as terms of degree, and are intended to account for the inherent variations in measured or calculated values that would be recognized by those of ordinary skill in the art.

As used herein, the terms "use," "using," and "used" may be considered synonymous with the terms "utilize," "utilizing," and "utilized," respectively.

When one or more embodiments may be implemented differently, a specific process order may be performed differently from the described order. For example, (i) the disclosed operations of a process are merely examples, and may involve various additional operations not explicitly covered, and (ii) the temporal order of the operations may be varied.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification.

In the following examples, the x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and equivalents thereof.

What is claimed is:

1. A display device comprising:

a plurality of display panel tiles, each comprising a display area comprising a plurality of pixels and a peripheral area around the display area, each one of the plurality of display panel tiles comprising:

a display element in the display area;

a thin-film encapsulation layer covering the display element;

a first insulating layer arranged on the thin-film encapsulation layer and having an opening partially overlapping a pixel of the plurality of pixels at an outermost part of the display area;

a second insulating layer filling the opening of the first insulating layer; and a refractive film on the first insulating layer in the peripheral area, wherein a refractive index of the second insulating layer is greater than a refractive index of the first insulating layer.

2. The display device of claim 1, wherein the opening is provided along an edge of the display area.

3. The display device of claim 1, wherein a side surface of the first insulating layer defining the opening comprises a forward tapered slope.

4. The display device of claim 1, wherein the first insulating layer comprises an inclined surface in the peripheral area, and the refractive film is on the inclined surface.

5. The display device of claim 1, wherein the plurality of display panel tiles comprises a first display panel tile and a second display panel tile adjacent to each other in a first direction, and wherein a first pixel of the first display panel tile and a second pixel of the second display panel tile arranged adjacent to each other in the first direction with the peripheral area therebetween emit light of a same wavelength range.

6. The display device of claim 5, wherein a gap between a display area of the first display panel tile and a display area of the second display panel tile in the first direction is narrower than a width of one pixel in the first direction.

7. The display device of claim 1, wherein the thin-film encapsulation layer comprises a first inorganic encapsulation layer, an organic encapsulation layer, and a second inorganic encapsulation layer sequentially stacked on the display element, and wherein, in the peripheral area, the second inorganic encapsulation layer contacts the first insulating layer.

8. A display device comprising:

a plurality of display panel tiles, each comprising a display area comprising a plurality of pixels and a peripheral area around the display area, each one of the plurality of display panel tiles comprising:

a display element in the display area;

a thin-film encapsulation layer covering the display element;

a first insulating layer arranged on the thin-film encapsulation layer and having an opening partially overlapping a pixel of the plurality of pixels at an outermost part of the display area;

a second insulating layer filling the opening of the first insulating layer;

a refractive film on the first insulating layer in the peripheral area;

cover windows arranged on the plurality of display panel tiles, wherein an edge of each one of the cover windows has a curved surface.

9. The display device of claim 8, wherein the refractive film overlaps an edge of a cover window of the cover windows and is attached to the cover window.

10. A display device comprising:

a plurality of display panel tiles, each comprising a display area comprising a plurality of pixels and a peripheral area around the display area, each of the plurality of display panel tiles comprising:

a display element in the display area;

a thin-film encapsulation layer on the display element;

a first insulating layer arranged on the thin-film encapsulation layer, having an opening provided in the display area along an edge of the display area, and having an inclined surface in the peripheral area;

a second insulating layer filling the opening of the first insulating layer; and a refractive film on the inclined surface of the first insulating layer in the peripheral area, wherein the plurality of display panel tiles comprise a first display panel tile and a second display panel tile adjacent to each other in a first direction, and wherein a first pixel of the first display panel tile and a second pixel of the second display panel tile arranged adjacent to each other in the first direction with the peripheral area therebetween emit light of a same wavelength range.

11. The display device of claim 10, wherein a gap between the display area of the first display panel tile and the display area of the second display panel tile in the first direction is narrower than a width of one pixel in the first direction.

12. The display device of claim 10, wherein the opening is provided to overlap the first pixel and the second pixel.

13. The display device of claim 10, wherein the refractive film is between the first pixel and the second pixel.

14. The display device of claim 10, further comprising a cover window on the second insulating layer, wherein the refractive film is on an edge of the cover window.

15. The display device of claim 14, wherein the edge of the cover window has a curved surface.

16. The display device of claim 10, wherein a refractive index of the second insulating layer is greater than a refractive index of the first insulating layer.

17. The display device of claim 10, wherein a side surface of the first insulating layer defining the opening comprises a forward tapered slope.

18. The display device of claim 10, wherein the thin-film encapsulation layer comprises a first inorganic encapsulation layer, an organic encapsulation layer, and a second inorganic encapsulation layer sequentially stacked on the display element, and wherein, in the peripheral area, the second inorganic encapsulation layer contacts the first insulating layer.

* * * * *